United States Patent
Winter et al.

(10) Patent No.: US 11,030,370 B2
(45) Date of Patent: Jun. 8, 2021

(54) MODULAR EVENT-BASED PERFORMANCE MONITORING IN INTEGRATED CIRCUIT DEVELOPMENT

(71) Applicant: International Business Machines Corporation, Armonk, NY (US)

(72) Inventors: Lahiruka Winter, Fishkill, NY (US); Daniel Saconn, Peekskill, NY (US); Kyle Phillips, Poughkeepsie, NY (US); Connor Nace, Wappingers Falls, NY (US); Zachary Neumann, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/587,356

(22) Filed: Sep. 30, 2019

(65) Prior Publication Data

US 2021/0097146 A1    Apr. 1, 2021

(51) Int. Cl.
   *G06F 30/3323*  (2020.01)
   *G06F 119/18*   (2020.01)
   *G06F 119/12*   (2020.01)

(52) U.S. Cl.
   CPC ...... *G06F 30/3323* (2020.01); *G06F 2119/12* (2020.01); *G06F 2119/18* (2020.01)

(58) Field of Classification Search
   CPC ............. G06F 30/3323; G06F 2119/18; G06F 2119/12
   See application file for complete search history.

(56) References Cited

U.S. PATENT DOCUMENTS

| 4,622,647 A | 11/1986 | Sagnard et al. |
| 6,691,064 B2 | 2/2004 | Vroman |
| 6,816,825 B1 | 11/2004 | Ashar et al. |

(Continued)

FOREIGN PATENT DOCUMENTS

EP    0908805 A1    4/1999

OTHER PUBLICATIONS

LaPlante et al., "Soliving Quality and Maintenance Problems with AI", O'Reilly Media, Inc., 2018, pp. 1-35.

(Continued)

*Primary Examiner* — Vuthe Siek
(74) *Attorney, Agent, or Firm* — Cantor Colburn LLP; William Kinnaman (57) ABSTRACT

Systems and methods to implement performance monitoring of a device under test involve defining one or more sequences. Each of the one or more sequences includes two or more events, each of the two or more events being defined by one or more hardware signals that include a hardware register value, transmission of a message or signal, or a wire voltage change. A method includes initiating a simulation of the device under test by inputting one or more signals at one or more inputs of the device under test for propagation across the device under test, and monitoring completion of the two or more events defining each of the one or more sequences. Performance of the device under test is reported. Reporting includes providing latency of each of the one or more sequences. A final design of the device under test is provided for fabrication based on the performance monitoring.

20 Claims, 3 Drawing Sheets

(56) References Cited

U.S. PATENT DOCUMENTS

| | | |
|---|---|---|
| 7,137,087 B1 | 11/2006 | Mohanty et al. |
| 7,200,778 B2 | 4/2007 | Johnson |
| 7,373,619 B2 | 5/2008 | Johnson |
| 7,552,036 B2 | 6/2009 | Oslake et al. |
| 8,171,455 B2 | 5/2012 | Fay |
| 8,229,723 B2 | 7/2012 | Srinivasan et al. |
| 9,246,756 B2 | 1/2016 | Jessee et al. |
| 9,910,086 B2 | 3/2018 | Czamara et al. |
| 10,074,402 B2 | 9/2018 | Mahate et al. |
| 10,102,323 B2 | 10/2018 | Zhang et al. |
| 2002/0143519 A1* | 10/2002 | Jain ................ G01R 31/318364 703/28 |
| 2004/0176929 A1 | 9/2004 | Joubert et al. |
| 2009/0109797 A1* | 4/2009 | Eidson .................. H04W 24/10 368/10 |
| 2010/0057400 A1 | 3/2010 | Chou et al. |
| 2014/0101058 A1 | 4/2014 | Castel et al. |
| 2018/0157574 A1 | 6/2018 | Mitra et al. |
| 2019/0286761 A1* | 9/2019 | Chou .................... G06F 30/367 |

OTHER PUBLICATIONS

Sharma, Pallavi, "Pre Silicon RTL Verification of Mixed Signal IPs through Real Value Modelling", Thapar Institute Thesis Paper, Jun. 11, 2018, pp. 1-74.

* cited by examiner

MODULAR EVENT-BASED PERFORMANCE MONITORING IN INTEGRATED CIRCUIT DEVELOPMENT

BACKGROUND

The present invention generally relates to integrated circuit (i.e., chip) development, and more specifically, to modular event-based performance monitoring in integrated circuit development.

Integrated circuits or chips are designed and fabricated using a number of processes over several phases. The processes associated with developing the chip include obtaining a register transfer level (RTL) description and performing physical design to identify and place components such as gate logic. The physical design processes generally begin with logic synthesis, which maps the RTL description to a gate-level netlist (i.e., list of logical interconnects or nets), and end with tapeout and mask generation, which refers to turning the design data into photomasks that are used in the manufacturing process. Throughout the process of finalizing the design to be fabricated, different aspects are tested and developed. For example, timing, noise, and power usage are analyzed at various stages of the design. Pre-silicon performance verification (PSPV) is a process of simulating, measuring, analyzing, and validating performance that pertains to the interfaces of circuitry and to signals or messages of the chip. This performance monitoring can be time-consuming and costly.

SUMMARY

Embodiments of the present invention are directed to modular event-based performance monitoring of a device under test. A non-limiting example computer-implemented method includes defining one or more sequences. Each of the one or more sequences includes two or more events, each of the two or more events being defined by one or more hardware signals that include a hardware register value, transmission of a message or signal, or a wire voltage change. The method also includes initiating a simulation of the device under test by inputting one or more signals at one or more inputs of the device under test for propagation across the device under test, and monitoring completion of the two or more events defining each of the one or more sequences. Performance of the device under test is reported. The reporting includes providing latency of each of the one or more sequences. A final design of the device under test is provided for fabrication based on the performance monitoring.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

As previously noted, different aspects of an integrated circuit design are tested and analyzed, sometimes in parallel, at different stages of development. The analysis and iterative redesign ensure that the integrated circuit meets timing, power, and performance requirements. As also noted previously, performance monitoring and verification involves simulating, measuring, analyzing, and validating performance at the interfaces of circuits of the chip. Specifically, the signals and messages exchanged at those interfaces are monitored and analyzed to judge the performance based on metrics of interest. Over the course of development of the design, both the design under test and the performance metrics of interest change frequently. There is rarely only one solution to any design decision that affects system performance. Thus, each candidate design must be compared objectively. In addition, there is rarely only one way to measure system performance, and each measurement can provide a different insight into the overall system. Thus, maintaining and scaling a pre-silicon performance verification (PSPV) system can be challenging.

A prior approach involves a hardware performance monitor that interfaces with the cores of a system to gather performance metrics such as latency and bandwidth, for example, using configurable parameters associated with the transactions to monitor. However, the performance gathering tools are synthesized with the hardware of the device under test such that the prior approach is a purely hardware solution. There is an inherent limit on the number of transactions that can be tracked, and monitoring can only be performed at hardware interfaces. Embodiments of the invention use a simulation of the register transfer level (RTL) code that represents the device under test. The monitoring is abstracted from hardware such that there are no hardware counters or instrumentation data built into the hardware description language (HDL). Sequences are defined by events that, in turn, are defined by one or more activities. Because the RTL code is simulated to monitor performance, there are no limits on the number of sequences being tracked as with the prior hardware solution. Further, the approach according to the invention provides flexibility with regard to the buses, register, and individual signals being monitored.

Figure 1:
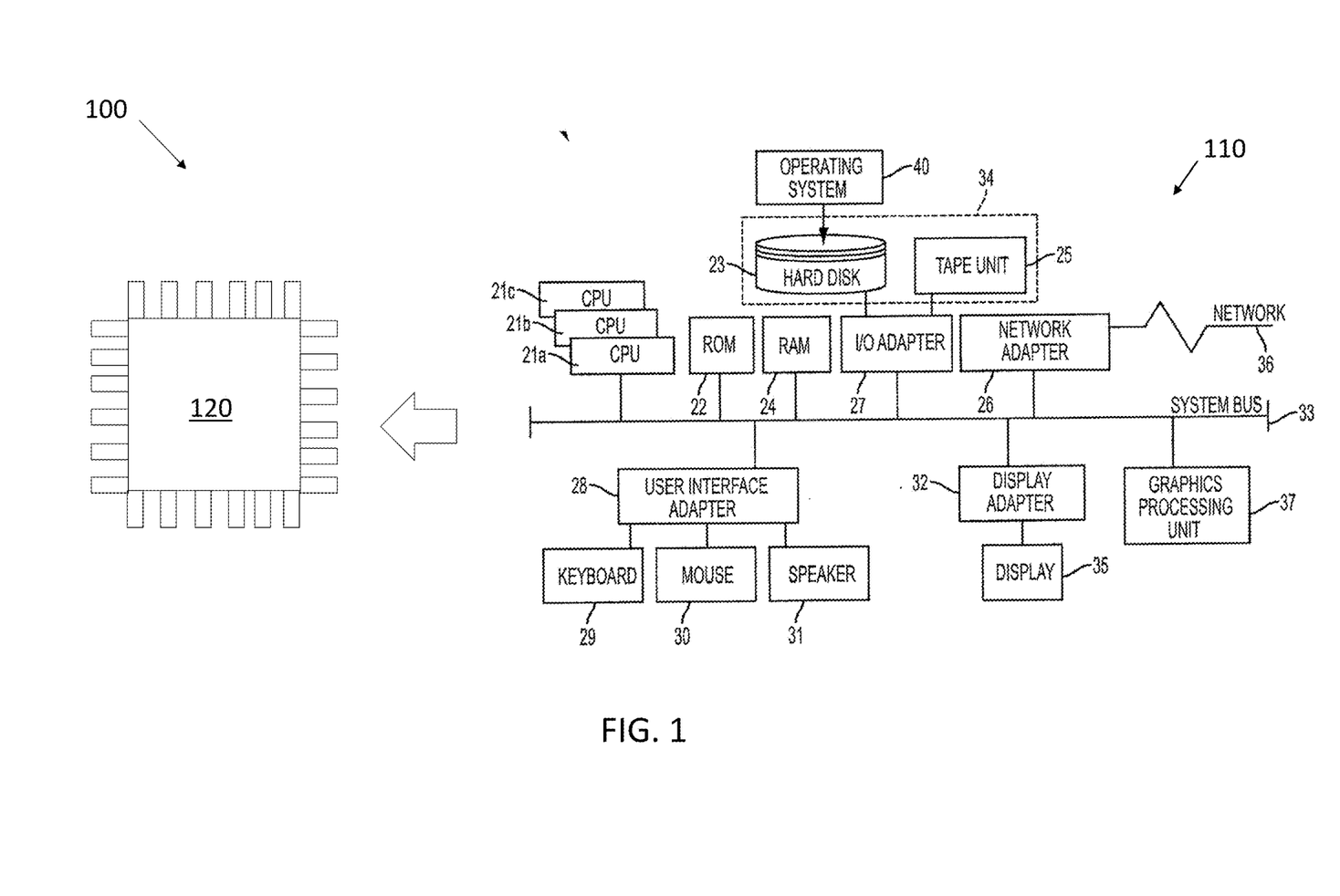
FIG. 1 is a block diagram of a system to perform modular event-based performance monitoring in integrated circuit development according to one or more embodiments of the invention.

FIG. 1 is a block diagram of a system 100 to perform modular event-based performance monitoring in integrated circuit development according to one or more embodiments of the invention. The system 100 includes a processing system 110 used to generate the design that is ultimately fabricated into an integrated circuit 120. The steps involved in the fabrication of the integrated circuit 120 are well-known and briefly described herein. Once the design and physical layout are finalized, based, in part, on the modular event-based performance monitoring according to embodiments of the invention, a finalized physical layout is provided to a foundry. Masks are generated for each layer of the integrated circuit based on the finalized physical layout. Then, the wafer is processed in the sequence of the mask order. The processing includes photolithography and etch. This is further discussed with reference to FIG. 3.

The processing system 110 has one or more central processing units (processors) 21a, 21b, 21c, etc. (collectively or generically referred to as processor(s) 21 and/or as processing device(s)). According to one or more embodiments of the present invention, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 110.

Further illustrated are an input/output (I/O) adapter 27 and a communications adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 110 can be stored in mass storage 34. The RAM 22, ROM 24, and mass storage 34 are examples of memory 19 of the processing system 110. A network adapter 26 interconnects system bus 33 with an outside network 36 enabling the processing system 110 to communicate with other such systems.

A display (e.g., a display monitor) 35 is connected to system bus 33 by display adaptor 32, which can include a graphics adapter to improve the performance of graphics intensive applications and a video controller. According to one or more embodiments of the present invention, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

According to one or more embodiments of the present invention, processing system 110 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing and has a highly parallel structure that makes it more effective than general-purpose CPUs for algorithms where processing of large blocks of data is done in parallel.

Thus, as configured herein, processing system 110 includes processing capability in the form of processors 21, storage capability including system memory (e.g., RAM 24), and mass storage 34, input means such as keyboard 29 and mouse 30, and output capability including speaker 31 and display 35. According to one or more embodiments of the present invention, a portion of system memory (e.g., RAM 24) and mass storage 34 collectively store an operating system such as the AIX® operating system from IBM Corporation to coordinate the functions of the various components shown in processing system 110.

Figure 2:
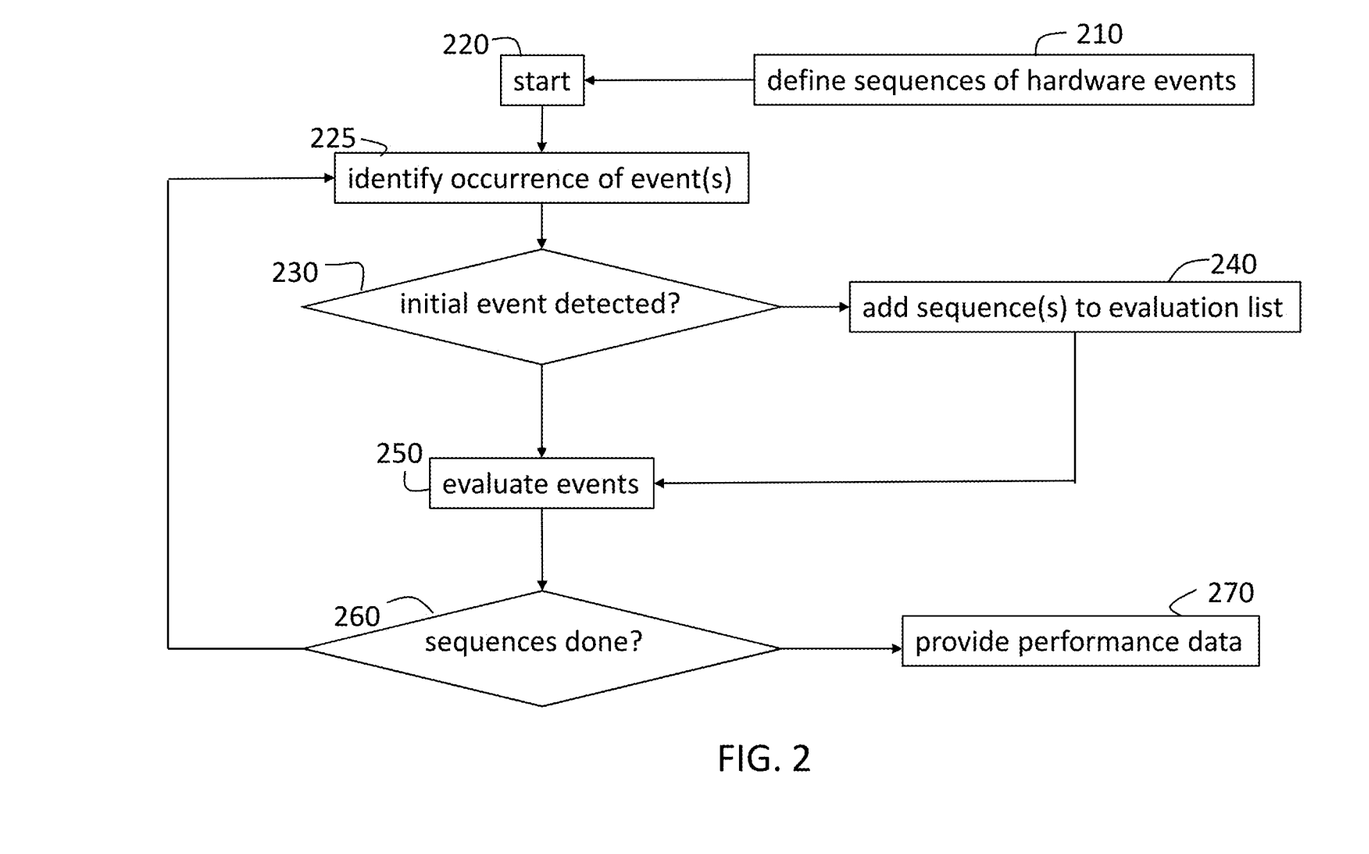
FIG. 2 is a process flow of a method of performing modular event-based performance monitoring in integrated circuit development according to one or more embodiments of the invention.

FIG. 2 is a process flow of a method 200 of performing modular event-based performance monitoring in integrated circuit development according to one or more embodiments of the invention. For explanatory purposes, the RTL representation of the integrated circuit 120 is referred to as the device under test. The processing system 110 may be used to store and implement the functionality of the device under test. At block 210, defining sequences of hardware events refers to defining a given sequence as a collection of discrete hardware events. The set of sequences that are defined can pertain to a particular test. That is, the process at block 210 can define sequences that should occur when a particular set of signals is input to the device under test (at block 220).

The hardware events that make up each sequence can be any hardware signal. Exemplary events include a particular hardware register value or set of values, transactions or messages crossing interfaces between components of the device under test, and a wire voltage going high or low. Each event is an independent condition that the hardware of the device under test must satisfy for the latency of one or more activities to be recorded. Because each event is an independent condition, an event definition can be reused across multiple sequences. Thus, more than one sequence can include the same event. Further, the events of a given sequence can be defined in a particular order (i.e., as an ordered sequence) or in any order (i.e., as an unordered sequence). Each sequence is defined with a unique initial event, and this initial event can be the initial event of more than one sequence. As discussed with reference to block 230, the initial event of a sequence facilitates triggering the monitoring system to begin evaluating a sequence.

At block 220, starting refers to initiating a driver to introduce input signals in the device under test. Like the device under test, the driver can also be implemented by the processing system 110. Based on the particular test being implemented, the driver will introduce certain input signals to the device under test (at block 220) to initiate the performance testing. These input signals will propagate through the integrated circuit design. At subsequent clock cycles, additional input signals can be introduced. The completion of certain events can trigger the driver to introduce additional input signals, as well. It is the propagation of the input signals in the device under test that is monitored to obtain performance data. Once the simulation is started, at block 220, identifying the occurrence of one or more events, at block 225, is performed. At block 230, a check is done of whether any identified event is an initial event of one or more sequences. If so, the corresponding one or more sequences is added to the evaluation list, at block 240. A sequence that is part of the evaluation list facilitates narrowing of the interfaces being examined. That is, the interfaces that generate events that are part of sequences in the evaluation list can be monitored. If the sequence is an ordered sequence, the interface associated with the next event can be monitored. If the sequence is an unordered sequence, then interfaces associated with all subsequent events in the sequence can be monitored. In addition, interfaces associated with additional initial events that correspond to defined sequences that are not yet part of the evaluation list can also be monitored.

At block 250, evaluating events in the sequences that are part of the evaluation list refers to associating events (identified at block 225) with the corresponding sequence and recording time stamps that will indicate latency information. As FIG. 2 indicates, the process at block 250 is reached when an event (identified at block 225) is not an initial event of a sequence (as checked at block 230) or after a sequence has been added to the evaluation list (at block 240). That is, all events, initial or not, are evaluated at block 250. At block 260, a check is done of whether all events of all defined sequences have been evaluated (at block 250). If not, the process, at block 225, of identifying the occurrence of an event is, is repeated for the next clock cycle. If all events of all defined sequences have been evaluated at block 250, according to the check at block 260, then, at block 270, providing performance data can include providing latency information. That is, the latency for completion of a sequence, as well as a more granular latency between events of a sequence, can be obtained and reported based on the time stamps that are part of messages and signals that make up the events of the sequences.

Figure 3:
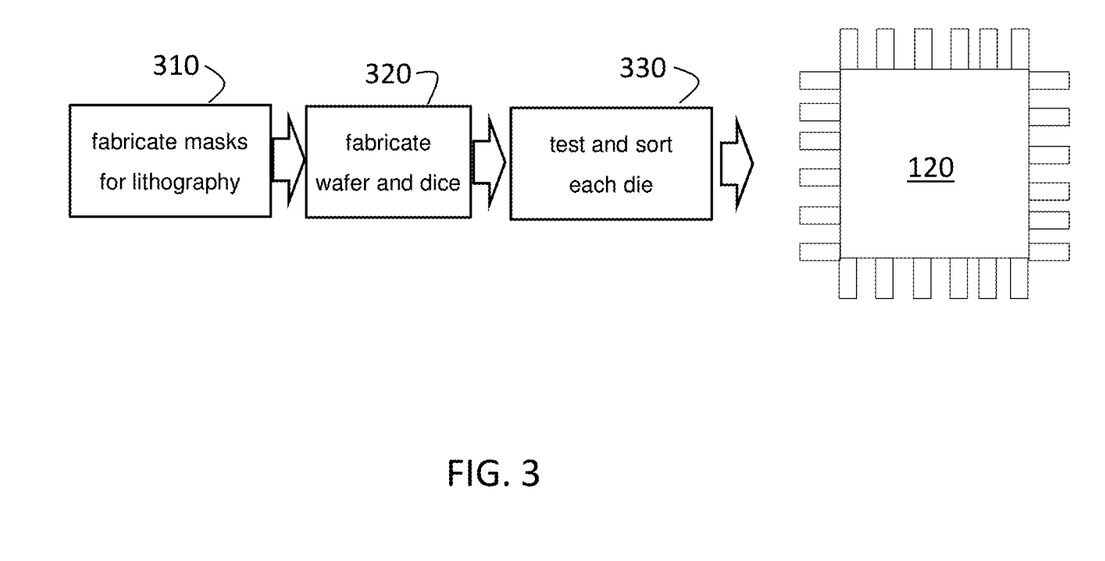
FIG. 3 is a process flow of a method of fabricating the integrated circuit according to exemplary embodiments of the invention.

FIG. 3 is a process flow of a method of fabricating the integrated circuit 120 according to exemplary embodiments of the invention. Once the physical design data is obtained, based, in part, on modular event-based performance monitoring according to one or more embodiments of the invention (e.g., the exemplary method 200), the integrated circuit 120 can be fabricated according to known processes that are generally described with reference to FIG. 3. Generally, a wafer with multiple copies of the final design is fabricated and cut (i.e., diced) such that each die is one copy of the integrated circuit 120. At block 310, the processes include fabricating masks for lithography based on the finalized physical layout. At block 320, fabricating the wafer includes using the masks to perform photolithography and etching. Once the wafer is diced, testing and sorting each die is performed, at block 330, to filter out any faulty die.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method of implementing performance monitoring of a device under test, the computer-implemented method comprising:
    defining, using a processor, one or more sequences, each of the one or more sequences including two or more events, each of the two or more events being defined by one or more hardware signals that include a hardware register value, transmission of a message or signal, or a wire voltage change;
    initiating, using the processor, a simulation of the device under test by inputting one or more signals at one or more inputs of the device under test for propagation across the device under test;
    monitoring, using the processor, completion of the two or more events defining each of the one or more sequences; and
    reporting performance of the device under test, the reporting including providing latency of each of the one or more sequences, wherein a final design of the device under test is provided for fabrication based on the performance monitoring.

2. The computer-implemented method according to claim 1, wherein the defining each of the one or more sequences includes defining a unique one of the two or more events as a first event that indicates a start of the sequence.

3. The computer-implemented method according to claim 2, further comprising, for each of the one or more sequences, based on identifying completion of the first event of the sequence, adding the sequence to an evaluation list and beginning the monitoring of the sequence.

4. The computer-implemented method according to claim 3, further comprising limiting interfaces of the device under test that are monitored to the interfaces of the device under test that correspond with the first event of each of the one or more sequences not yet on the evaluation list and to the interfaces of the device under test that correspond with events of the two or more events after the first event of each of the one or more sequences on the evaluation list.

5. The computer-implemented method according to claim 1, further comprising examining a time stamp of each of the two or more events of each of the one or more sequences, wherein the reporting the performance of the device under test additionally includes providing latency among the two or more events of each of the one or more sequences based on the time stamps of each of the two or more events of each of the one or more sequences.

6. The computer-implemented method according to claim 1, wherein the monitoring is continued for multiple clock cycles.

7. The computer-implemented method according to claim 6, further comprising inputting additional one or more signals at one or more of the multiple clock cycles.

8. A system to implement performance monitoring of a device under test, the system comprising:
    a memory having computer readable instructions; and
    one or more processors for executing the computer readable instructions, the computer readable instructions controlling the one or more processors to perform operations comprising:
        defining one or more sequences, each of the one or more sequences including two or more events, each of the two or more events being defined by one or more hardware signals that include a hardware register value, transmission of a message or signal, or wire voltage change;
        initiating a simulation of the device under test by inputting one or more signals at one or more inputs of the device under test for propagation across the device under test;
        monitoring completion of the two or more events defining each of the one or more sequences; and
        reporting performance of the device under test, the reporting including providing latency of each of the one or more sequences, wherein a final design of the device under test is provided for fabrication based on the performance monitoring.

9. The system according to claim 8, wherein the one or more processors perform the defining each of the one or more sequences by defining a unique one of the two or more events as a first event that indicates a start of the sequence.

10. The system according to claim 9, wherein the one or more processors additionally perform, for each of the one or more sequences, based on identifying completion of the first event of the sequence, adding the sequence to an evaluation list and beginning the monitoring of the sequence.

11. The system according to claim 10, wherein the one or more processors additionally perform limiting interfaces of the device under test that are monitored to the interfaces of the device under test that correspond with the first event of each of the one or more sequences not yet on the evaluation list and to the interfaces of the device under test that correspond with events of the two or more events after the first event of each of the one or more sequences on the evaluation list.

12. The system according to claim 8, wherein the one or more processors additionally perform examining a time stamp of each of the two or more events of each of the one or more sequences, wherein the reporting the performance of the device under test additionally includes providing latency among the two or more events of each of the one or more sequences based on the time stamps of each of the two or more events of each of the one or more sequences.

13. The system according to claim 8, wherein the one or more processors perform the monitoring for multiple clock cycles.

14. The system according to claim 13, wherein the one or more processors additionally perform inputting additional one or more signals at one or more of the multiple clock cycles.

15. A computer program product comprising a computer readable storage medium having program instructions embodied therewith, the program instructions executable by a processor to cause the processor to perform operations of implementing performance monitoring of a device under test comprising:
  defining one or more sequences, each of the one or more sequences including two or more events, each of the two or more events being defined by one or more hardware signals that include a hardware register value, transmission of a message or signal, or wire voltage change;
  initiating a simulation of the device under test by inputting one or more signals at one or more inputs of the device under test for propagation across the device under test;
  monitoring completion of the two or more events defining each of the one or more sequences; and
  reporting performance of the device under test, the reporting including providing latency of each of the one or more sequences, wherein a final design of the device under test is provided for fabrication based on the performance monitoring.

16. The computer program product according to claim 15, wherein the defining each of the one or more sequences includes defining a unique one of the two or more events as a first event that indicates a start of the sequence.

17. The computer program product according to claim 16, further comprising, for each of the one or more sequences, based on identifying completion of the first event of the sequence, adding the sequence to an evaluation list and beginning the monitoring of the sequence.

18. The computer program product according to claim 17, further comprising limiting interfaces of the device under test that are monitored to the interfaces of the device under test that correspond with the first event of each of the one or more sequences not yet on the evaluation list and to the interfaces of the device under test that correspond with events of the two or more events after the first event of each of the one or more sequences on the evaluation list.

19. The computer program product according to claim 15, further comprising examining a time stamp of each of the two or more events of each of the one or more sequences, wherein the reporting the performance of the device under test additionally includes providing latency among the two or more events of each of the one or more sequences based on the time stamps of each of the two or more events of each of the one or more sequences.

20. The computer program product according to claim 15, wherein the monitoring is continued for multiple clock cycles and the operations additionally include inputting additional one or more signals at one or more of the multiple clock cycles.

* * * * *